United States Patent [19]
Osterbrink

[11] Patent Number: 6,026,853
[45] Date of Patent: Feb. 22, 2000

[54] FUEL TANK FILLER NECK CHECK VALVE

[75] Inventor: Mark D. Osterbrink, St. Clair Shores, Mich.

[73] Assignee: Borg-Warner Automotive, Inc., Sterling Heights, Mich.

[21] Appl. No.: 08/815,155

[22] Filed: Mar. 11, 1997

[51] Int. Cl.[7] .................................................. F16K 15/00
[52] U.S. Cl. .................................. 137/527.4; 137/527.8; 137/527
[58] Field of Search ..................... 137/527, 535, 137/587, 588, 592, 527.8, 527.6, 527.4

[56] References Cited

U.S. PATENT DOCUMENTS

| | | | |
|---|---|---|---|
| 1,196,405 | 8/1916 | Steeg | 137/527.4 |
| 2,048,943 | 7/1936 | Munn | 137/527.4 |
| 2,482,198 | 9/1949 | Melichar | 137/527 |
| 2,503,031 | 4/1950 | Davidson . | |
| 2,913,001 | 11/1959 | Maslow et al. | 137/527.4 |
| 2,923,317 | 2/1960 | McInerney | 137/527.4 |
| 2,925,825 | 2/1960 | Staiger | 137/527.4 |
| 3,060,961 | 10/1962 | Conley | 137/527.4 |
| 3,182,951 | 5/1965 | Spencer | 137/527.4 |
| 3,331,391 | 7/1967 | Merdinyan | 137/527 |
| 3,395,727 | 8/1968 | Weise et al. | 137/527.4 |
| 3,730,216 | 5/1973 | Arnett et al. . | |
| 3,783,893 | 1/1974 | Davison | 137/527 |
| 3,911,949 | 10/1975 | Hilden et al. . | |
| 3,937,441 | 2/1976 | Baumann | 137/527 |
| 4,164,958 | 8/1979 | Jaconette | 137/527 |
| 4,301,833 | 11/1981 | Donald, III . | |
| 4,526,216 | 7/1985 | Lake, Jr. . | |
| 4,825,902 | 5/1989 | Helms | 137/527 |
| 4,971,103 | 11/1990 | Scaramucci | 137/527.8 |
| 4,977,936 | 12/1990 | Thompson et al. . | |
| 4,982,759 | 1/1991 | Scaramucci | 137/527.8 |
| 4,995,433 | 2/1991 | Beicht et al. . | |
| 5,042,678 | 8/1991 | Munguia . | |
| 5,282,497 | 2/1994 | Allison | 137/588 |
| 5,320,147 | 6/1994 | Jamrog . | |
| 5,322,100 | 6/1994 | Buechler et al. . | |
| 5,431,199 | 7/1995 | Benjay et al. . | |
| 5,568,838 | 10/1996 | Harris | 137/587 |

*Primary Examiner*—Denise L. Ferensic
*Assistant Examiner*—Joanne Y. Kim
*Attorney, Agent, or Firm*—Harness, Dickey & Pierce; Greg Dziegielewski

[57] ABSTRACT

The present invention provides a check valve including a seal door which is normally spring biased towards a closed position but which is responsive to a flow of fuel for displacing to an open position to allow fuel to pass in a first direction and for thereafter preventing passage of liquid fuel or fuel vapors in a second direction. According to the invention, the check valve is disposed at a lower end or in the midsection of a fuel tank filler pipe. The check valve includes an annular housing having a concentric annular valve seat portion including a frustoconical valve seat facing toward the lower end of the filler pipe. A seal door attached to a hinge member is resiliently biased toward engagement with the valve seat by a spring member. The inflow of fuel overcomes the bias of the spring member which causes the seal door to displace to an open position to allow passage of fuel to the fuel tank. The seal door is returned to a closed position under the bias of the spring member in the absence of the inflowing fuel to prevent liquid fuel and fuel vapor from discharging into the atmosphere.

20 Claims, 2 Drawing Sheets

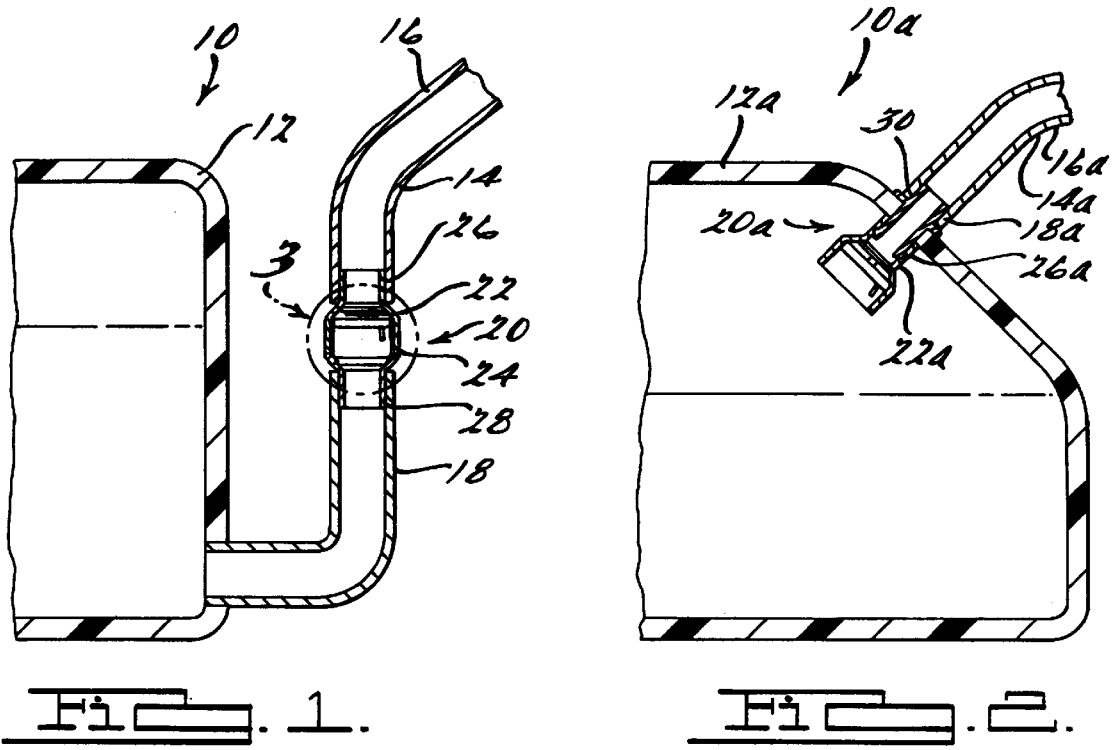
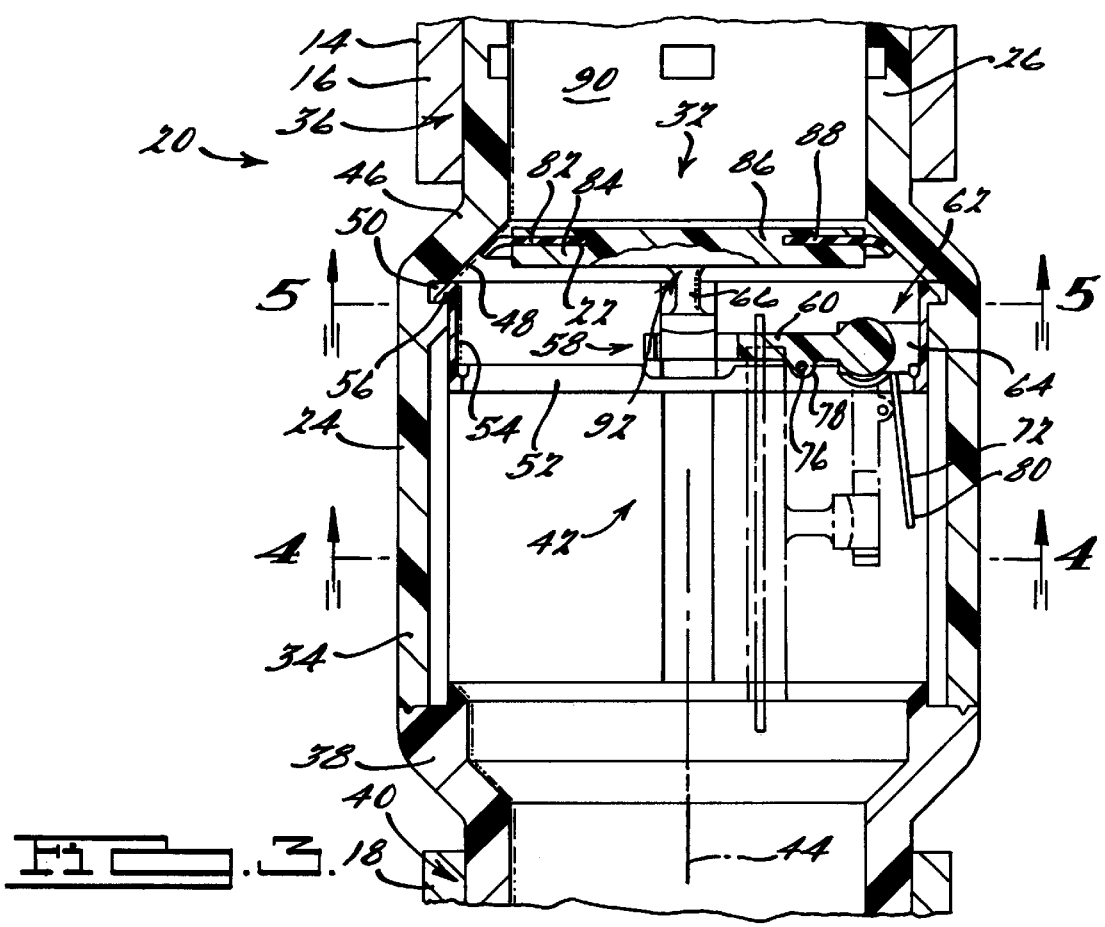

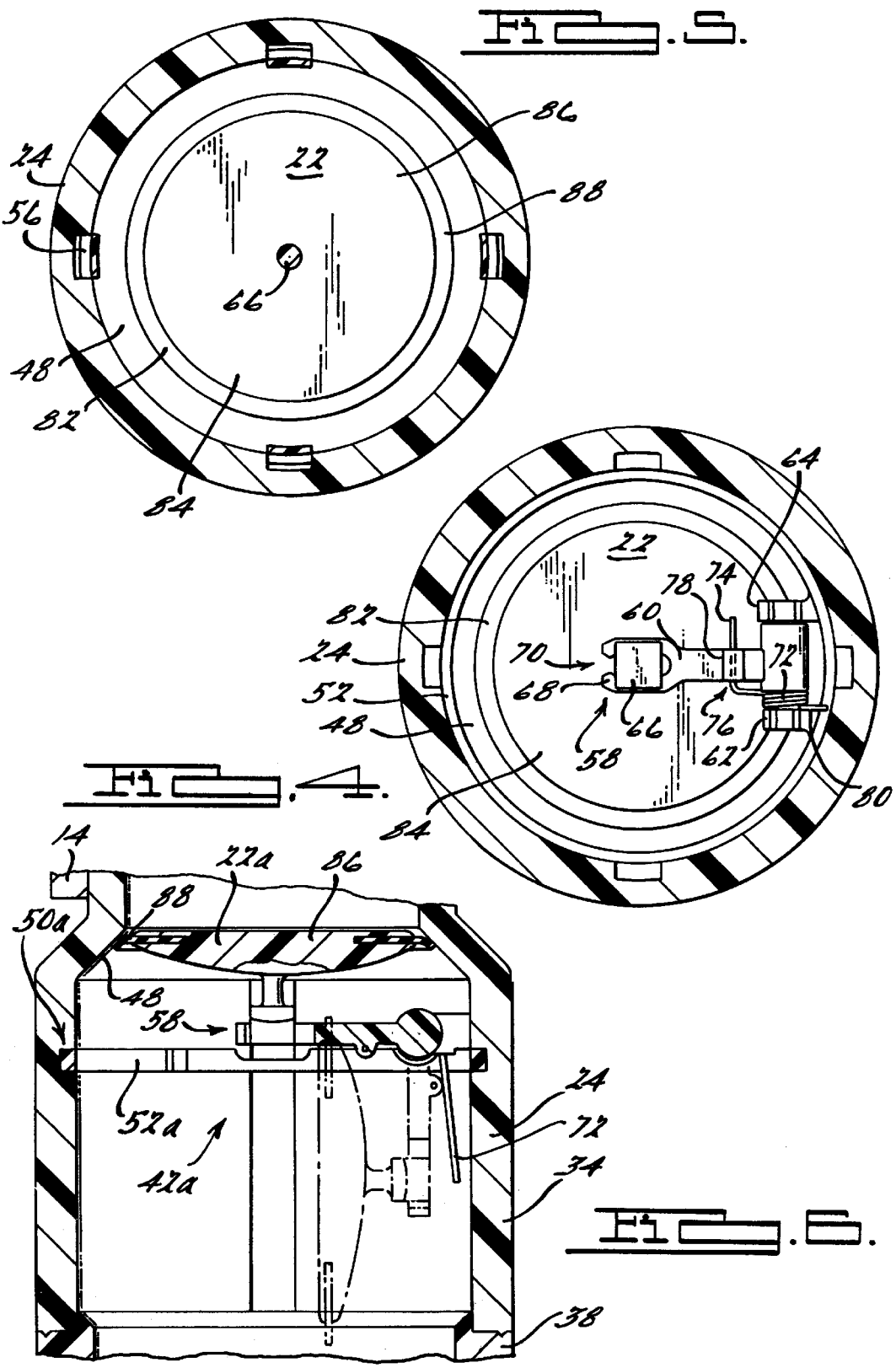

FUEL TANK FILLER NECK CHECK VALVE

BACKGROUND OF THE INVENTION

1. Technical Field

This invention generally relates to sealing apparatus for motor vehicle fuel tanks and, more particularly, to a fuel tank filler pipe check valve for preventing unwanted discharge of liquid fuel and fuel vapor into the atmosphere when the fuel cap is removed.

2. Discussion

Automotive fuel tanks are refuelled by means of a filler pipe that carries a detachable cap at its open end. This detachable cap is customarily designed to seal the open end of the filler pipe when it is installed. However, there are instances when the gas cap is not properly installed after refuelling or forgotten altogether.

If the cap is damaged, loose, or not installed, the fill pipe is essentially open. This is an undesirable situation for many reasons particularly since it can effect the unwanted discharge of liquid fuel and fuel vapors into the atmosphere. Without some sort of device, such as, for example, a warning light on the dashboard of the vehicle, the operator would not be aware that the cap is not in place. Therefore, the unwanted discharge will continue unabated until discovered by the vehicle operator.

Most present day passenger vehicles have fuel tanks with filler pipes that are used in conjunction with a fuel dispenser nozzle inserted therein to introduce fuel into the fuel tank. When the tank has been completely filled with fuel, a pressure remains in the tank which forces excess fuel up the filler pipe to the nozzle. This is undesirable since fuel remains in the filler pipe under pressure after refueling.

Therefore, it would be desirable to provide a check valve disposed at a lower end or midstream of a filler pipe which yields under the pressure of inflowing fuel to an open position but seals against fuel and vapor back-flow. In this way, fuel and vapor are prevented from progressing into the filler pipe after the fuel tank has been filled to maximum capacity.

SUMMARY OF THE INVENTION

The above and other objects are provided by a check valve including a seal door which is normally spring biased towards a closed position but which is responsive to a flow of fuel for displacing to an open position to allow fuel to pass in a first direction and for thereafter preventing passage of liquid fuel or fuel vapors in a second direction. According to the invention, the check valve is disposed at a lower end or midstream of a fuel tank filler pipe. The check valve includes an annular housing having a concentric annular valve seat portion including a frustoconical valve seat facing toward the lower end of the filler pipe. A seal door attached to a hinge member is resiliently biased toward engagement with the valve seat by a spring member. The inflow of fuel overcomes the bias of the spring member which causes the seal door to displace to an open position to allow passage of fuel to the fuel tank. The seal door is returned to a closed position under the bias of the spring member in the absence of the inflowing fuel to prevent liquid fuel and fuel vapor from discharging into the atmosphere.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a sectional view of a bottom fill type vehicle fuel system incorporating a check valve in accordance with the present invention;

FIG. 2 is a sectional view of a top fill type vehicle fuel system incorporating an alternate embodiment of a check valve of the present invention;

FIG. 3 is a more detailed view of the check valve of FIG. 1 illustrating the seal door in a closed position and depicting the seal door in an open position in phantom;

FIG. 4 is a plan view of the check valve hinge and spring members taken along line 4—4 of FIG. 3;

FIG. 5 is a plan view of the check valve seal door taken along line 5—5 of FIG. 3; and FIG. 6 is a sectional view of an alternate embodiment check valve illustrating a plano-convex seal door in a closed position and depicting the seal door in an open position in phantom.

DETAILED DESCRIPTION OF THE PREFERRED EMBODIMENTS

Referring now to FIG. 1, a vehicle fuel system 10 is shown including a fuel tank 12, a filler pipe 14 having an upper end or inlet 16 and a lower end or outlet 18 separated from the upper end 16 by a check valve 20. In the embodiment of FIG. 1, the vehicle fuel system 10 is a bottom fill system of a known type.

The check valve 20 in FIG. 1 in a closed position seals the fuel tank 12 from the upper end 16 of the filler pipe 14. However, according to the present invention, the check valve 20 displaces to an open position to allow filling of the fuel tank 12 with fuel in response to a predetermined pressure of inflowing fuel across the seal door 22. As shown in FIG. 1, the check valve 20 includes an annular housing 24 defined between a pair of oppositely extending neck portions 26, 28 inserted within the upper and lower ends 16, 18 of the filler pipe 14 respectively.

Referring now to FIG. 2, an alternate vehicle fuel system 10a is shown including a fuel tank 12a, a filler pipe 14a having an upper end or inlet 16a and a lower end or outlet 18a coupled to the fuel tank 12a with a check valve 20a. In the embodiment of FIG. 1, the fuel system is a top fill system of a known type. As illustrated, the check valve 20a includes a sleeve 30 extending from the interior of the fuel tank 12a and inserted within the lower end 18a of the filler pipe 14a.

As with the valve 20 depicted in FIG. 1, the check valve 20a in FIG. 2 in a closed position seals the fuel tank 12a from the filler pipe 14a. Again, however, the check valve 20a displaces to an open position to allow filling of the fuel tank 12a with fuel in response to a predetermined pressure of inflowing fuel across the seal door 22a. Unlike the check valve 20, the check valve 20a includes only one neck portion 26a extending in a first direction from the annular housing 24a.

Turning now to FIG. 3, the check valve 20 of FIG. 1 is shown in greater detail mounted within the filler pipe 14 to open and close a filler pipe flow path 32 in the manner of a trap door. Although particular emphasis is given to the check valve 20 hereinafter, one skilled in the art will appreciate that the following description is also applicable to the check valve 20a.

The check valve 20 in the illustrative embodiment includes a two-piece assembly having a first cup-like insert 34 which fits axially into the filler pipe upper end 16, sealed at the interface 36 with an annular seal or filler pipe crimp and a second cup-like insert 38 which fits axially into the filler pipe lower end 18, sealed at the interface 40 with an annular seal or filler pipe crimp. The first insert 34 is abuttingly secured to the second insert 38, to define the annular housing 24 therebetween. The two piece construction of the check valve 20 and the resulting annular housing 24 permits the mounting of the seal door assembly 42 within the annular housing 24 along a central axis 44.

The first insert 34 includes a concentric annular valve seat portion 46 including a frustoconical annular valve seat 48 facing in a direction toward the lower end 18 of the filler pipe 14. The first insert 34 also includes a plurality of radially extending recesses 50 axially spaced apart from the concentric annular valve seat portion 46. Although the plurality of recesses 50 are depicted, it should be noted that a radial extending annular groove may also be employed within the annular housing 24 with similar results. As illustrated in FIG. 3, the first insert 34 is a molded plastic insert which carries the seal door assembly 42.

The seal door assembly 42 includes an annular ring 52 supporting the seal door 22 within the annular housing 24. As illustrated, the annular ring 52 has a diameter equal to or slightly less than an inside diameter of the annular housing 24. The annular ring 52 is suspended from a plurality of vertical posts 54 extending upwardly from the annular ring 52, each post 54 including a radially extending tab 56 at a distal end thereof circumferentially engaging the annular recesses 50.

Referring again to FIG. 3, the seal door 22 is pivotally or hingedly mounted via a hinge member 58 to the annular ring. 52 for rotating between a closed position and an open position thereabout. The hinge member 58 includes a first radially extending arm 60 journally secured about a pivot pin 62 held in place on a cubical ear projection 64 formed integrally with the annular ring 52 radially offset from the axis 44.

Referring now also to FIG. 4, the first arm 60 is coupled to a second axially extending arm 66 downwardly projecting from the seal door 22 positioned relative to the seal door 22 such that the spring closing force is applied to the center of the seal door 22. The second arm 66 is preferably cylindrically shaped to minimize turbulence of the fuel flow therearound when the seal door 22 is in an open position. Also, since the pressure of inflowing fuel is borne by the seal door 22 and hinge member 58 in an open position, it is preferred that the coupling between the first arm 60 and second arm 66 include vertical or linear play relative to the pivot pin 62. This allows the seal door 22 to "float" as well as pivot when opened or closed, helping align the seal door 22 with the annular valve seat 48 and improving its seal. As seen in FIG. 4, to accomplish this, the first arm 60 includes a bifurcated end 68 defining a slot 70 for slidingly engaging the second arm 66.

Still referring to FIG. 4, a coil spring 72 is disposed about the pivot pin 62 and is held or fastened at one end 74 to an opening 76 in an ear 78 (FIG. 3) projecting from the first arm 60. As depicted in FIG. 4, the spring 72 is metal. The free end 80 of the spring 72 frictionally engages an interior surface of the annular housing 24 to enable loading thereof when the seal door 22 is pivoted. The spring 72 normally biases the seal door 22 to the closed position against the annular valve seat 48 as illustrated in FIG. 3. However, the bias of the spring 72 is overcome by inflowing fuel enabling the seal door 22 to rotate to an open position as depicted in phantom in FIG. 3.

Referring now to FIGS. 3 and 5, the illustrated embodiment of the seal door 22 includes a flexible member 82 and a rigid member 84. It is preferred that the upper member 82 be interposed within the rigid members 84 by overmolding. When assembled, upper member 82 and lower member 84 preferably define a plastic plate portion 86 supporting a radially extending rubber flange portion 88.

The plate portion 86 is centered within and extends upwardly towards the filler pipe 14 to a point below the annular valve seat 48. The diameter of the plate portion 86 is slightly less than that of the aperture 90 within the neck portion 26 of the first insert 34. The flange portion 88 is of a diameter greater than the aperture 90 but less than that of the annular housing 24 so that its upper surface comes into contact with the annular valve seat 48 in the closed position.

The spring closing force on the seal door 22 is applied at 92 which is centered relative to the annular housing 24 and annular valve seat 48 to apply even sealing force about the periphery of the seal door 22. Inflow of fuel through the filler pipe 14 and against the seal door 22 pivots the seal door 22 about the pivot pin 62, simultaneously applying torque to the spring 72. The seal door 22 is displaced to an open position, shown in phantom in FIG. 3, to allow fuel to pass to the fuel tank 12. When the fuel flow is stopped, the spring 72 via the end 74 forces the seal door 22 back to the closed position to prevent outflow of liquid fuel and fuel vapor from the fuel tank 12.

The strength of the spring 72 is selected to yield to a predetermined pressure of fuel from the upper end 16 of the filler pipe 14 which forces the flange portion 88 downwardly off the annular valve seat 48 to open the flow path 32 through the filler pipe 14 to the fuel tank 12. Preferably, approximately one inch of non-flowing fuel within the filler pipe upper end 16 will overcome the bias of the spring 72 and displace the seal door 22. However, this may be modified as desired.

Turning now to FIG. 6, an alternate embodiment of the seal door assembly 42a is shown with like reference numerals indicating like elements. In this embodiment, the seal door 22a has a generally plano-convex or airfoil-type shape which shifts the center of gravity of the seal door 22a to a geometrically centered position. This causes the door seal 22a to self-center upon returning to a closed position such that the flange portion 88 evenly mates with the annular valve seat 48 about its periphery. Also, the airfoil configuration of the seal door 22a depicted in FIG. 6 establishes a pressure differential between the top surface and bottom surface thereof as fuel flows therearound. The pressure differential holds the seal door 22a in an open position vertically orientated relative to the fuel flow when fuel is flowing through the filler pipe. This reduces vibrations of the seal door 22a when in an open position.

The embodiment illustrated in FIG. 6 also includes an annular ring 52a which is directly seated within the annular groove 50a. This configuration obviates the need for posts 54 and tabs 56 as in the first embodiment. The annular ring 52a is preferably a resilient split-type snap ring having a diameter in a relaxed state slightly greater than an inside diameter of the housing. The ring 52a is inserted into the groove 50a by pinching it outboard of the split to decrease its diameter and inserting it into the annular housing 24. When properly positioned, the resiliency of the ring 52a forces it radially outward and into engaging relation with the groove 50*a*. It should be noted that the axial spacing of the groove 52*a* relative the valve seat 48 may be decreased over the first embodiment since the posts 54 have been omitted.

Thus, according to the present invention, a check valve is disposed at a lower end or midstream of a fuel tank filler pipe such that the dispenser nozzle does not come into contact with the seal door when it is inserted within the filler pipe. The fluid force of inflowing fuel pivots the seal door about the pivot pin to an open position against the force of the spring. This opens the fluid flow path through the filler pipe to the fuel tank. After fueling is complete, the seal door is returned to a closed position under the force of the spring to prevent liquid fuel and fuel vapor from discharging from the fuel tank when the fuel cap or filler pipe are damaged or absent.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A check valve for redundant sealing of a fuel tank from outflow of fuel from the tank while allowing inflow of fuel to the tank, said tank including a fuel filler pipe having a fuel input end and a tank connection end, said check valve comprising:

an annular housing having an axis, said annular housing including a concentric annular valve seat portion including a valve seat facing in a direction toward said tank end of said fuel filler pipe;

a hinge member axially spaced from said concentric annular valve seat, said hinge member engaging at least a portion of an inner surface of said annular housing; and a seal member attached to said hinge member, said seal member being resiliently biased toward engagement of said valve seat via a spring member, said seal member being responsive to a flow of fuel for allowing fuel to pass in a first direction, and for thereafter sealing of the passage of fuel in a second direction the configuration of said hinge member providing effectively low biasing for allowing fuel to pass said first direction during refilling of the fuel.

2. The valve of claim 1 wherein said valve seat has a generally frustoconical shape.

3. The valve of claim 1 wherein said seal member includes a rubber flange extending generally radially therefrom.

4. The valve of claim 1 wherein said seal member is attached to said hinge member by way of an axially extending arm connected to a radially extending arm.

5. The valve of claim 1 wherein said spring member is a metal coil spring.

6. The valve of claim 1 wherein said annular housing includes an inner wall having a plurality of radially extending recesses therein, and wherein said hinge portion is attached to said wall by way of tabs extending into said radially extending recesses.

7. The valve of claim 1 wherein said annular housing is molded of plastic material with said valve seat integrally molded therewith.

8. A check valve for preventing the outflow of liquid fuel or fuel vapor from a motor vehicle fuel system of the type including a filler pipe coupled to a fuel tank, the filler pipe having an upper end separated from a lower end by the check valve, the check valve comprising:

at least one cup-like insert including a neck portion separated from an annular housing portion by a frustoconical valve seat;

said annular housing portion including a plurality of radially extending recesses formed in an inner wall thereof;

an annular ring having a plurality of vertically extending posts upwardly projecting therefrom, each post having a radially extending tab projecting from a distal end thereof, said tabs engaging said recesses to suspend said annular ring therefrom;

a seal door journally coupled to said annular ring via a hinge member for movement between a closed position whereat said seal door mates with said valve seat to prevent outflow of liquid fuel and fuel vapor from said fuel tank and an open position whereat said seal door is displaced from said valve seat for allowing inflow of fuel to said fuel tank through said filler pipe; and a spring member coupled to said seal door normally biasing said seal door toward said closed position and yielding to a predetermined inflow of fuel to permit said seal door to pivot to said open position via said hinge member.

9. The valve of claim 8 wherein said valve seat has a frustoconical shape.

10. The valve of claim 8 wherein said hinge member further comprises:

a first axially extending arm downwardly projecting from said seal door;

a second radially extending arm coupled to said first arm at a first end and journally coupled to said annular ring at a second end.

11. The valve of claim 10 wherein said first end of said second arm is bifurcated to define a slot for slidingly engaging said first arm.

12. The valve of claim 8 wherein said seal door further comprises a rigid plate member supporting a radially extending flexible flange portion.

13. The valve of claim 12 wherein said plate comprises plastic and wherein said flange comprises rubber.

14. The valve of claim 12 wherein said flange has a diameter slightly less than an inside diameter of said neck portion and slightly greater than an inside diameter of said annular housing member such that a top surface of said flange engages said valve seat when said seal door is in said closed position.

15. The valve of claim 8 wherein said plurality of recesses are interconnected to form a radially extending annular groove in said inner wall of said annular housing.

16. The valve of claim 15 wherein said annular ring comprises a resilient split snap ring directly seated within said annular groove.

17. The valve of claim 8 wherein said spring member comprises a metal coil spring having a first end coupled to said hinge member.

18. A check valve for preventing the outflow of liquid fuel or fuel vapor from a motor vehicle fuel system of the type including a filler pipe coupled to a fuel tank, the filler pipe having an upper end separated from a lower end by the check valve, the check valve comprising:

at least one cup-like insert including a neck portion separated from an annular housing portion by a frustoconical valve seat;

said annular housing portion including a plurality of radially extending recesses formed in an inner wall thereof;

an annular ring having a plurality of vertically extending posts upwardly projecting therefrom, each post having a radially extending tab projecting from a distal end thereof, said tabs engaging said recesses to suspend said annular ring therefrom;

a seal door journally coupled to said annular ring via a hinge member for movement between a closed position whereat said seal door mates with said valve seat to prevent outflow of liquid fuel and fuel vapor from said fuel tank and an open position whereat said seal door is displaced from said valve seat for allowing inflow of fuel to said fuel tank through said filler pipe;

said seal door including a rigid plate member supporting a radially extending flexible flange portion, said flange portion having a diameter slightly less than an inside diameter of said neck portion and slightly greater than an inside diameter of said annular housing member such that a top surface of said flange portion engages said valve seat when said seal door is in said closed position;

said hinge member including a first axially extending arm downwardly projecting from said seal door and a second radially extending arm slidingly engaging said first arm at a bifurcated first end and journally coupled to said annular ring at a second end via a pivot post; and a coil spring member having a first end coupled to said hinge member normally biasing said seal door toward said closed position and yielding to a predetermined inflow of fuel to permit said seal door to pivot to said open position via said hinge member.

19. The valve of claim 18 wherein said plurality of recesses are interconnected to form a radially extending annular groove in said inner wall of said annular housing.

20. The valve of claim 18 wherein said annular ring comprises a resilient split snap ring directly seated within said annular groove.

\* \* \* \* \*

UNITED STATES PATENT AND TRADEMARK OFFICE
CERTIFICATE OF CORRECTION

PATENT NO.    : 6,026,853
DATED         : February 22, 2000
INVENTOR(S)   : Mark D. Osterbrink Page 1 of 2

It is certified that error appears in the above-identified patent and that said Letters Patent is hereby corrected as shown below:

Title Page, under [56] References Cited, U.S. PATENT DOCUMENTS, Line 20, after "4,526,216 7/1985 Lake, Jr.", insert on new line --4,762,247 9/1988 Temmesfeld--.

Title Page, under [56] References Cited, U.S. PATENT DOCUMENTS, Line 26, after 5,042,678 8/1991 Munguia", insert on new line -- 5,159,953 11/1992 Sato et al. --.

Title Page, under [56] References Cited, U.S. PATENT DOCUMENTS, Line 29, after "5,322,100 6/1994 Buechler et al.", insert on new line --5,327,933 7/1994 Ishikawa et al. --.

Title Page, under [56] references Cited, U.S. PATENT DOCUMENTS, Line 31, "5,568,838" should be --5,568,828--.

UNITED STATES PATENT AND TRADEMARK OFFICE
CERTIFICATE OF CORRECTION

PATENT NO.   : 6,026,853
DATED        : February 22, 2000
INVENTOR(S)  : Mark D. Osterbrink It is certified that error appears in the above-identified patent and that said Letters Patent is hereby corrected as shown below:

Title Page, under [56] References Cited, insert on new line 32 --FOREIGN PATENT DOCUMENTS-- and on the following line --DE 3432873 A1 8/185 Germany--.

Column 3, Line 35, "ring 52" should be --ring 52--.

Signed and Sealed this

Nineteenth Day of June, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,026,853
DATED : February 22, 2000
INVENTOR(S) : Mark D. Osterbrink It is certified that error appears in the above-identified patent and that said Letters Patent is hereby corrected as shown below:

Title Page, under [56] References Cited, U.S. PATENT DOCUMENTS, Line 20, after "4,526,216 7/1985 Lake, Jr.", insert on new line -- 4,762,247 9/1988 Temmesfeld --.

Title Page, under [56] References Cited, U.S. PATENT DOCUMENTS, Line 26, after "5,042,678 8/1991 Munguia", insert on new line -- 5,159,953 11/1992 Sato et al. -- and on the following new line -- 5,172,721 12/1992 Sato et al. --.

Title page, under [56] References Cited, U.S. PATENT DOCUMENTS, Line 29, after "5,322,100 6/1994 Buechler et al.", insert on new line -- 5,327,933 7/1994 Ishikawa et al. --.

Title page, under [56] references Cited, U.S. PATENT DOCUMENTS, Line 31, "5,568,838" should be -- 5,568,828 --.

Title page, under [56] References Cited, insert on new line 32 -- FOREIGN PATENT DOCUMENTS -- and on the following line -- DE 3432873 A1 8/1985 Germany --.

Column 3,
Line 35, "ring. 52" should be -- ring 52 --.

This certificate supersedes Certificate of Correction issued June 19, 2001.

Signed and Sealed this

Twenty-fourth Day of December, 2002

JAMES E. ROGAN
*Director of the United States Patent and Trademark Office*